Patented Sept. 30, 1930

1,777,045

REISSUED

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

METHOD OF TREATING RUBBER LATEX AND PRODUCT OBTAINED THEREBY

No Drawing. Application filed July 2, 1925, Serial No. 41,234. Renewed May 8, 1929.

The methods heretofore employed for concentrating latex have employed desiccation means with or without vacuum. It has been customary to employ a coagulation preventative in the latex during the concentration. The present invention relates to methods of concentrating rubber latex without the use of apparatus, although the invention is not restricted to the absence of mechanical devices. Concentration according to the present process is accomplished by a physico-chemical process which at the same time lends itself to the separation of a portion of the non-rubber constituents originally present in the latex.

Accordingly the object of the invention is to provide methods for concentrating rubber latex by physico-chemical means. Another object of the invention is to provide a process for separating the rubber-containing portion of the latex from the aqueous portion without coagulation.

With a preferred embodiment in mind, but without intending to limit the invention beyond what may be required by the prior art, the invention consists in treating rubber latex with an organic colloid in the presence of an acid, preferably a weak organic acid, or in the presence of an alkali. More specifically the invention consists in treating latex with a pectin body in the presence of a weak organic acid to segregate the rubber globules in the latex in a supernatant layer and recovering from the supernatant layer an uncoagulated latex of higher concentration than that of the original untreated latex.

A number of organic colloids such as Irish moss, salep root, gum tragacanth, gum arabic, and other similar materials will cause the rubber globules in latex to rise to the upper portion of the body of latex and to be present in the upper portion of the latex in a more concentrated form. It has now been discovered that the presence of an acid or of an alkali greatly accelerates the speed with which this concentration takes place. For example latex containing Irish moss with a small amount of citric acid or other weak organic acid will separate into a layer considerably faster than a similar body of latex treated with Irish moss alone. As only a very small amount of acid is added, the increased speed cannot be attributed to coagulation, for the resultant concentrate may be completely dispersed in water to give a rubber latex which is not appreciably different from ordinary rubber latex.

As an example of the increased rate of concentration with organic colloids containing small amounts of acid, the following may be mentioned. A colloidal solution is made up of 0.5 parts by weight of Irish moss to 100 of water. Citric acid, to the amount of 1.4% of the weight of the moss is added. Of this mixture, 0.6 to 0.9 parts by weight are added to 100 parts of rubber in the form of latex. The concentration will start in about an hour, as compared with 4 hours or more for latex treated with Irish moss alone.

If the citric acid be replaced by an equal weight of sodium hydroxide, an acceleration of the rate of concentration is observed, but not to the same degree. In general, the fruit acids, citric, tartaric, malic, lactic, etc. possess the same property of accelerating the rate of concentration.

In the above example use is made of mixtures of organic colloids with acids or alkalies. If pectin bodies be employed, there is a natural combination of organic colloid and weak organic acid. The separation and concentration acomplished by the use of pectin bodies is more rapid and greater than the use of organic colloids alone, and in most cases is even more efficient than the use of organic colloids with small amounts of organic acids.

Pectin bodies occur in fruit juices such as the juices of apples, cherries, citrus fruits, gooseberries, and other fruits. These pectin substances yield viscous solutions with water, and by their transformation into pectic acid by the enzyme pectase they produce the so-called vegetable jellies. The pectin bodies are believed to be compounds of various carbohydrates of acid groups, whose composition is unknown. The molecular complexes known as pectin bodies may be readily hydrolized. Under the influence of oxidation reactions they form pectic acid. In this respect the pectin bodies differ from the so-called vegetable mucilages for the latter when oxidized yield mucic acid.

In applying the pectin bodies to the treatment of latex, the pectin may be obtained in several ways. For instance it may be derived from any one of the ordinary fruits such as the orange, lemon, citron, apple, by a water extraction of the pulp of the fruit, or it may be employed in its pure state as it appears on the market for use in the manufacture of fruit jellies, or the pulp of the fruit, together with the juice may be used as such. One-half to three parts of the pectin body are added to 100 parts of rubber in the form of latex containing say 35% of rubber. The latex is then thoroughly stirred and allowed to come to rest. Within two or three hours the separation into two layers takes place, the upper layer being a pure white cream and the lower layer a steel-gray colored liquid. The rubber will be found in the upper layer in a higher concentration than it was originally present. For example the concentration may be increased from the original 35% of rubber to as high as 80% of rubber in the same volume. The degree of concentration can be controlled by the length of duration of the concentration process and it is also influenced by the original concentration of the latex. If the original latex contains but 10% of rubber, the time lapsed until 80% is reached is obviously longer. Heating has the effect of increasing the speed of concentration, and this fact is of advantage when dilute latices are being concentrated.

As stated above it is not necessary to remove either the fruit juice or the fruit pulp unless it is so desired. The presence of fruit acids actually accelerates the rate of concentration.

On account of the fact that the latex treated according to the above examples will separate into layers, centrifugal means may be employed to accelerate the rate of separation. With slight modifications almost any type of centrifuge may be employed. The separation into layers may also be utilized as a means of eliminating a portion of the non-rubber constituents from the concentrated latex. By shaking up the concentrated latex in a fresh volume of water and repeating the previously described processes a further removal of water soluble non-rubber constituents may be accomplished, if desired, and the invention may be employed as a means of removing the water-soluble constituents, whether the latex be concentrated during the operation or not. Vulcanized latex may be treated in the same way as fresh latex or preserved latex.

Having thus described my invention what I claim and desire to protect by Letters Patent is:

1. A process for treating rubber latex which consists in segregating the rubber-containing portion in said latex by allowing the latex to cream after treatment with an organic colloid and a small portion of a latex coagulant, said coagulant being present in amounts too small to cause coagulation, removing the aqueous portion therefrom, and recovering an uncoagulated rubber dispersion from said latex.

2. A process for treating rubber latex which consists in segregating the rubber-containing portion in said latex by allowing the latex to cream after treatment with an organic colloid and an acid coagulant, said coagulant being present in amounts too small to cause coagulation, removing the aqueous portion therefrom, and recovering an uncoagulated rubber dispersion from said latex.

3. A process for treating rubber latex which consists in segregating the rubber-containing portion in said latex by allowing the latex to cream after treatment with an organic colloid and a weak acid coagulant, said coagulant being present in amounts too small to cause coagulation, removing the aqueous portion therefrom, and recovering an uncoagulated rubber dispersion from said latex.

4. A process for treating rubber latex which consists in segregating the rubber-containing portion in said latex by allowing the latex to cream after treatment with an organic colloid and a weak organic acid coagulant, said coagulant being present in amounts too small to cause coagulation, removing the aqueous portion therefrom, and recovering an uncoagulated rubber dispersion from said latex.

5. A process for treating rubber latex which consists in segregating the rubber-containing portions in said latex by treatment with a pectin body, removing the aqueous portion from said latex, and recovering an uncoagulated rubber dispersion therefrom.

6. A process for concentrating latex which consists in segregating the rubber-containing portion in said latex by allowing the latex to cream after treatment with an organic colloid and an acid coagulant, said coagulant being present in amounts too small to cause coagulation, removing the aqueous portion therefrom, and recovering an uncoagulated concentrated rubber dispersion from said latex.

7. A process for concentrating latex which consists in segregating the rubber-containing portion in said latex, by allowing the latex to cream after treating the latex with an organic colloid and an acid coagulant, said coagulant being present in amounts too small to cause coagulation, removing the rubber-free aqueous portion therefrom, treating the rubber dispersion with additional quantities of water, repeating the segregation of the rubber therein and removal of the rubber-free serum, and recovering an uncoagulated concentrated rubber dispersion containing a sub-normal amount of non-rubber constituents originally present in said latex.

8. A process for concentrating latex which consists in segregating the rubber-containing portion in said latex by treating with a pectin body, removing the aqueous portion therefrom, and recovering an uncoagulated concentrated rubber dispersion from said latex.

9. A process for concentrating latex which consists in segregating the rubber-containing portion in said latex by treating the latex with a pectin body, removing the rubber-free aqueous portion therefrom, treating the rubber dispersion with additional quantities of water, repeating the segregation of the rubber therein and removal of the rubber-free serum, and recovering an uncoagulated concentrated rubber dispersion containing a sub-normal amount of non-rubber constituents originally present in said latex.

10. A process for concentrating latex which consists in segregating the rubber-containing portion in said latex, by treating the latex with a pectin body in the presence of a weak organic acid, removing the rubber-free aqueous portion therefrom, treating the rubber dispersion with additional quantities of water, repeating the segregation of the rubber therein and removal of the rubber-free serum, and recovering an uncoagulated concentrated rubber dispersion containing a sub-normal amount of non-rubber constituents originally present in said latex.

11. A process for concentrating latex which consists in centrifugally separating the rubber contained therein after treatment with a pectin body, supplying additional quantities of water to the recovered rubber portion, and repeating the centrifugal separation until substantially all the water soluble non-rubber constituents have been removed from the rubber, and recovering an uncoagulated concentrated rubber dispersion.

12. As a new product, an uncoagulated rubber dispersion containing a small amount of an organic colloid and a weak acid coagulant.

13. As a new product, a concentrated latex containing a small amount of an organic colloid and a trace of a weak organic acid.

14. As a new product, a concentrated latex containing a pectin body.

15. As a new product, a concentrated latex containing a small amount of an organic colloid and a trace of a weak organic acid, said concentrated latex containing a sub-normal amount of the non-rubber constituents originally present in said latex.

16. As a new product, a concentrated latex containing a pectin body, said concentrated latex containing a sub-normal amount of the non-rubber constituents originally present in said latex.

Signed at New York, county of New York, and State of New York, this 25th day of June, 1925.

JOHN McGAVACK.